Feb. 10, 1942. W. TAMMINGA 2,272,442
MILK DISPENSER
Filed March 20, 1940 2 Sheets-Sheet 1

INVENTOR.
WILLIAM TAMMINGA
BY
ATTORNEY.

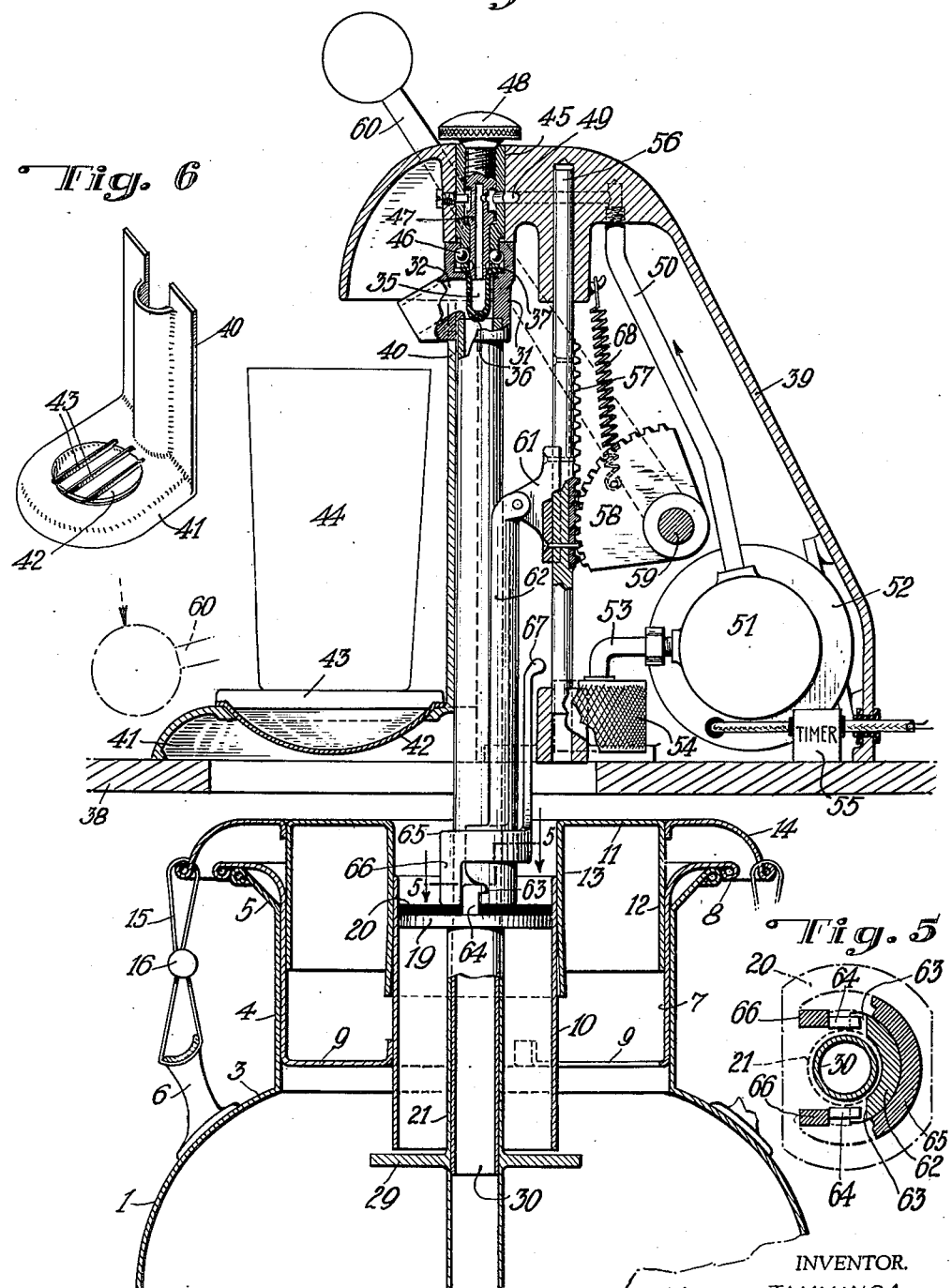

Patented Feb. 10, 1942

2,272,442

UNITED STATES PATENT OFFICE 2,272,442

MILK DISPENSER

William Tamminga, Bronx, N. Y., assignor to Monitor Process Corporation, Jersey City, N. J., a corporation of New Jersey Application March 20, 1940, Serial No. 324,938

16 Claims. (Cl. 221—67)

This invention relates to the retail dispensing of milk directly from milk delivery cans in which said milk is shipped from the creamery or producer to the retailer.

The primary object of the invention is to provide a relatively simple and convenient assembly wherein the milk delivery can, equipped with fluid pumping means, is adapted to be placed beneath a shelf or counter and operatively connected with pump operating and milk delivery means positioned upon the counter for the purpose of elevating the milk from the can to a point above the counter and discharging said milk into a container, such as a tumbler or drinking glass held beneath an appropriate outlet associated with the structure.

An assembly of this character has rigid sanitary requirements for the boards of health of the larger municipalities in particular are alert to the protection of the consumer against contaminated milk. Consequently all parts of the structure which may come into contact with the milk from the time that it is put into the can until it is delivered into the drinking glass must be maintained absolutely clean and sterile.

Numerous dispensers have heretofore been suggested, wherein the maintenance of a sterile condition of the milk dispensing devices is left to the retailer, but experience has shown that retailers are apt to become careless and in any event do not have the facilities to thoroughly clean and sterilize these parts. The better practice, therefore, is to so constitute the dispensing devices that all parts thereof which come in contact with the milk shall be so associated with the can that they form, in effect, an inherent part of the package or milk container and are thus thoroughly cleaned and sterilized at the creamery and before the milk is introduced into the can for shipment. In this way creameries, which are equipped for proper cleaning and sterilizing, attend to these important factors in the course of preparing the milk for shipment, so that the can, as well as the associated dispensing devices through which the milk passes during the delivery thereto, are conditioned for sterile dispensing of the milk and the retail dealer does not require independent equipment for this purpose.

According to the present invention, therefore, all portions of the milk dispensing mechanism with which the milk may come into contact are incorporated in the can construction and are shipped with the full can of milk to the retailer in sterile condition, so that he may set up the can in a position to dispense the milk and thereupon attach to the dispensing devices of the can an appropriate operating device for actuating the same as and when desired. These operating devices do not contact with the milk and while they should of course be kept clean, the rigid requirements of sterility and cleanliness thereof are not of primary importance. Consequently the present invention contemplates that the operating device form a part of the retailer's equipment with which successive cans of milk are adapted to be consecutively associated as the contents of each is exhausted.

The present invention embodies numerous novel features, all calculated to produce an efficient dispensing apparatus so constituted that the parts thereof will not be apt to get out of order and embodying means whereby air under pressure may be admitted from time to time into the can for the purpose of so agitating the contents thereof as to keep the cream thoroughly distributed by precluding stratification thereof.

These features, as well as others, will be hereinafter described in detail, and will be apparent from the accompanying drawings and the appended claims.

The accompanying drawings illustrate one practical embodiment of the invention, but the construction therein shown is to be understood as illustrative, only, and not as defining the limits of the invention.

Figure 4 is a vertical section showing a can in dispensing condition with the dispensing devices of the can structure in such a way as to dispense milk as and when desired from the can.

Figure 5 is a section on the line 5—5 of Figure 4.

Figure 6 is a perspective view, on a smaller scale, of the front plate shown in Figure 4.

Figure 2:
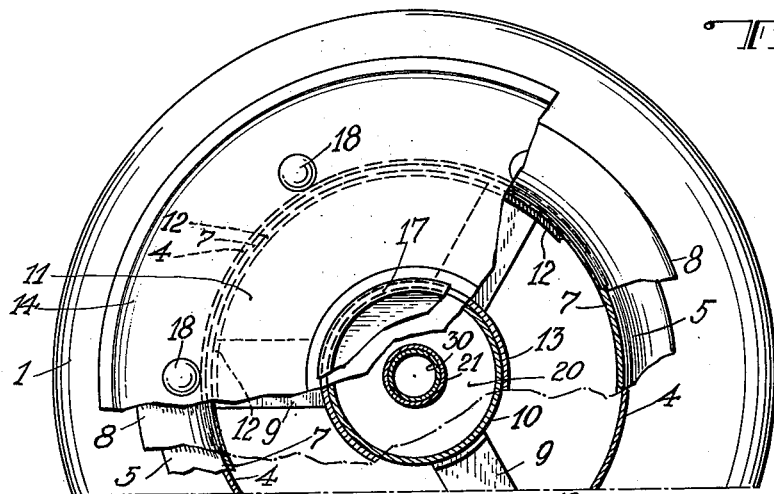
Figure 2 is a plan view of the structure shown in Figure 1 with certain parts broken away, so as to more clearly illustrate the invention.
Figure 1:
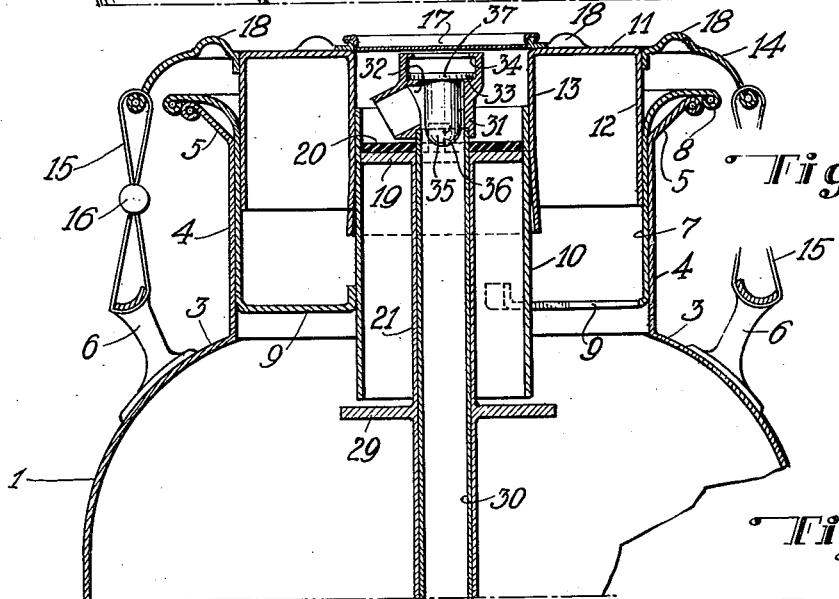
Figure 1 is a central section of a milk can embodying the present invention, showing the same in the sealed condition in which it is adapted to be shipped full of milk to the retailer.
Figure 3:
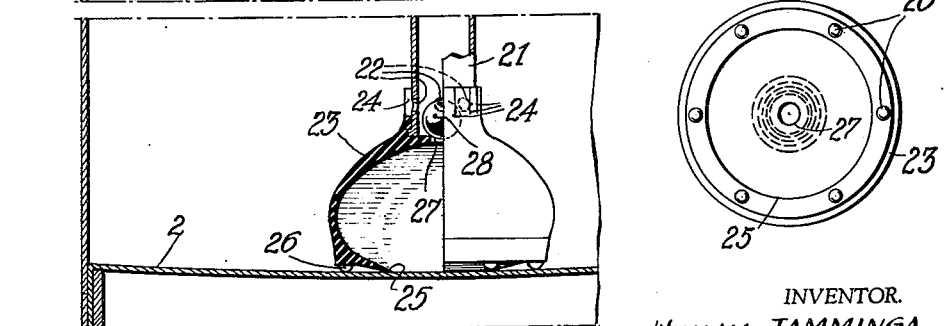
Figure 3 is a bottom view of a pump bulb shown in Figure 1.

Referring first to Figures 1, 2 and 3 which show the can alone, I designates the body of the can having a closed bottom 2, a breast 3, and a superimposed neck 4. The upper end of which is flared outwardly at 5 and rolled in the usual manner. On the breast 3 are appropriate handles 6 by which the can may be handled and lifted. Fitted into the neck is a sleeve 7, the upper end of which is flared outwardly and rolled as shown at 8 to rest upon the top of the neck, while the bottom of the sleeve has radially and inwardly extending arms 9 secured to and supporting an upstanding cylindrical guide 10 which is co-axial with the neck. The cover of the can is made in two parts. The part 11 is substantially annular and is of inverted U-shape section being provided at its outer periphery with a depending skirt 12 to fit into the sleeve 7, while at its inner periphery, it has a depending sleeve 13 adapted to have a close sliding fit with the exterior of the cylindrical guide 10. The sleeve 13 flares outwardly towards its bottom to more readily coact with the guide 10, while the skirt 12 may flare inward slightly, so as to seat firmly within the sleeve 7.

Arranged peripherally of the inner section 11 is an annular outer section 14 in the form of a hood permanently united to the section 11 and adapted to reach outwardly and overlie the flared portion 5 of the neck and the corresponding portion of the sleeve 7. The outer section 14 is perforated, so that a wire or metal strip 15 may be passed therethrough and, when this strip is also passed through the handles, a seal 16 may be applied, so that the can is sealed in closed position except for the central opening in the section 11. This is adapted to be normally closed by a pressed fit closure 17, as shown in Figure 1, so that by this means the can may be absolutely sealed against the entrance of dirt, water or other extraneous matter. Bosses 18 struck up from the outer portion 14 of the cover permit cans to be stacked one upon the other without damaging the seals 17 and at the same time permitting the cans to set solidly in a stack.

Mounted to reciprocate within the cylindrical guide 10 is a piston 19 which fits loosely within the guide, but has thereon a superimposed elastic washer, such as rubber 20 which expands within the guide to closely conform with the walls thereof and seal the confines of the guide against the passage therethrough of any extraneous matter into the can.

Integral with or permanently secured to the metal piston 19 is a tubular valve stem 21. This stem extends downwardly to a point near the base of the can, has an open lower end, and a series of perforations or vent holes 22 adjacent said open end. The lower end of this valve stem has a tight forced fit into the chambered hub of a rubber pump bulb 23. The portion of the hub which embraces the lower end of the valve stem is slitted, as at 24, so that said part embodies a plurality of resilient tongues normally closing the vent holes 22, but sufficiently resilient to permit the escape of air under pressure through said holes. The resiliency of these tongues, however, should be such that the hydrostatic head of liquid which may occupy the valve stem, as hereinafter described, will not cause an opening of said vents. The valve bulb 23 is formed integrally with its hub and is of a hollow substantially elliptical section having walls sufficiently thin to permit the bulb to be compressed but sufficiently heavy to bring about the expansion of the bulb into its normal position when pressure thereon is relieved. The bulb has a central opening 25 at its bottom and toward this opening the wall of the bulb tapers to a very thin flexible edge. Around the periphery of the bottom of the bulb are a series of integral bosses 26 adapted to rest on the bottom of the can and the bulb is so shaped that the edge of the opening 25 normally also tends to rest on the bottom of the can.

The upper part of the bulb is sealed except for a central opening 27 and a spherical ball valve 28 is loosely placed in the valve stem 21 for cooperation with this opening. Mounted on the valve stem is a transverse rod or spider 29 which limits the upward movement of the valve stem, but permits the bulb to be lifted free of the bottom of the can.

Extending downwardly into the valve stem and having a close sliding fit therewith is a delivery pipe 30 and rigidly mounted on the upper end of this delivery pipe is a fitting 31 having an outlet spout 32. Above the outlet spout are two vertically spaced apart seats 33 and 34 forming between them an annular channel in the fitting. A nipple valve 35 is adapted to occupy a position within the fitting. This nipple valve is of substantially cylindrical form and is closed at its lower end except for a normally closed slit 36. The side walls of the nipple are relatively thin, but it is provided at its top with an outwardly extending flange 37 adapted to rest upon the lower seat 33. The parts as thus far described illustrate the can and the associated parts of the dispensing mechanism, all of which are adapted to be thoroughly cleaned and sterilized before the can is filled with milk and the cover applied to prepare the full can for shipment from the creamery to the retail dealer.

When thus shipped, the seals 16 are in place and the closure 17 is in the position shown in Figure 1, so that the can is effectually sealed in closed condition to be delivered in a wholesome state.

When the can is received by the retail dealer, it is adapted to be positioned beneath a counter or shelf 38 shown in Figure 4 and on which counter an operating device is mounted in fixed position to cooperate with the dispensing means in the can, as next to be described, but it should be understood that before placing the can beneath the counter, the closure 17 should be removed to render the top of the cylindrical guide 10 and the fitting 31 therein accessible.

The preferred form of dispensing device which I employ is shown in Figures 4-6 inclusive. It comprises an appropriate housing 39 mounted in fixed position on the top of the counter. This housing has an open front which is normally closed by a front plate 40 shown in detail in Figure 6. This front plate is provided with a base 41 having therein a catch basin 42 which may, if desired, have a connection to the sewer or some other waste receptacle and above the catch basin is a grid 43 on which a tumbler 44 is adapted to be placed in the dispensing position shown in Figure 4.

When associating a can with the dispensing device, the cover, however, is removed and again placed in position after the parts have been brought into proper cooperative relation with the can as next to be described.

Mounted in axial alinement with the can as shown in Figure 4 and extending through the top of the housing is a sleeve 45, the lower end of which is reduced, so that, when the delivery pipe is elevated, this sleeve may project into the top of the fitting 31 to seat upon the flange 37 of the nipple valve 35. In the reduced portion of this sleeve are a series of annularly arranged holes and in each of these holes is a clutch ball 46.

Extending downwardly through the sleeve is a clutch member 47, the lower end of which is tapered to conical form, while the upper end of this clutch member is threaded into the upper portion of the sleeve. Rigid with the clutch member is a finger piece 48, so that after the delivery tube has been raised to position the lower reduced end of the sleeve within the chamber at the top of the fitting 31, the finger piece 48 may be rotated to screw down the clutch member 47, so that the conical lower end thereof is forced between and apast the balls 46, whereby said balls are pressed in an outward radial direction and cooperate with the under side of the upper flange 34 of said fitting to lock the fitting firmly to the sleeve and force the lower end of the sleeve to an air-tight seat on the flange 37.

It will be noted from Figure 4 that the clutch member 47 is hollow, and that the interior thereof is in communication with a passage 49 in the housing. This passage leads to a compressed air supply pipe 50 connected to a pump 51 which is connected to and driven from a motor 52. The pump has an air inlet 53 leading from a filter 54, so that, as the pump is operated, air is drawn in through the filter, passed through the pump and from thence through the pipe 50 and passage 49 to the hollow clutch member. The compressed air passes downwardly through the hollow clutch member into the nipple valve 35 and, after serving to expand said valve sufficiently to close the delivery passage 32, said air passes downwardly through the delivery tube and through the valve stem 21 and out through the vent holes 22 and bubbles up through the milk in the can to thoroughly agitate the same and preclude stratification of the cream therein. The supply of air to the can, as stated, is accomplished periodically by corresponding operations of the motor 52 which are controlled by a timer 55. This timer serves to bring about energizing of the motor at stated intervals, so as to bring about corresponding agitation of the milk.

Guided for vertical reciprocation in the housing is a pump operating rod 56 having thereon a rack 57 meshing with a quadrant 58. This quadrant is fixed on a rock shaft 59 to which is fixed a handle 60. As this handle is moved from the full line to the dot and dash line position of Figure 4, and vice versa, the rod 56 is raised and lowered. A spring 68 normally elevates the rod.

Rigidly supported on the rod 56 is a bracket 61 and to this bracket is pivoted a hanger 62. This hanger is of a shape to partially embrace the delivery tube and it is provided at its lower end with a pair of jaws 63 positioned on diametrically opposite sides of the tube. These jaws are adapted to be engaged, by swinging movement of the hanger 62, with a pair of undercut studs 64 rigid with the piston 19.

Mounted for vertical sliding movement on the hanger 62 is a yoke 65 having a pair of depending fingers 66 adapted when lowered into the position shown in Figure 4 to lock the jaws 63 to the undercut studs 64 with the lower end of the hanger tightly pressed against the rubber washer 20. A handle 67 provides for convenient manipulation of the yoke 65, so that it may be raised to permit the hanger to be pivotally moved to bring its jaws into and out of engagement with the undercut studs or to lock the jaws to the studs as shown in Figure 4.

When the hanger is locked to the studs, movement of the handle 60 will raise and lower the piston and the valve bulb 23 therewith. As the valve bulb is raised, by movement of the handle 60 from the dot and dash line position of Fig. 4 to the full line position thereof, the valve bulb will be lifted free from the bottom of the can with the result that milk will flow into the interior of said bulb. When the handle, however, is moved in a contra-direction, the valve bulb will be lowered to seat it on the bottom of the can and thereafter continued downward movement of the valve stem 21 will compress said bulb and tend to flatten it against the bottom of the can. This will place the milk within the bulb under pressure which will cause the thin edge of the bulb about the opening 25 to be pressed firmly against the bottom of the can, while the milk in the bulb will lift the valve 28 to unseal the opening 27 and said milk will thereupon pass upwardly through the valve stem and through the delivery tube 30 to the delivery spout 32 from whence it is discharged into the tumbler 44. If desired, the capacity of the bulb may be such as to fill the glass 44 at each operation or it may be of a lesser capacity, so that a plurality of operations of the handle are necessary to fill the glass. This is immaterial so far as the present invention is concerned.

The device is operated in the manner described until the entire contents of the can have been dispensed. The finger piece 48 is then turned to release the delivery pipe and the pipe is thereupon pressed downwardly, after removal of the front plate 40, until it enters the interior of the inner section 13 of the can cover. The yoke 65 is then lifted and the jaws 63 are swung free from the undercut studs 64. Inasmuch as the spring 68 normally elevates the handle 60 into the position shown in Figure 4, the can is now fully released and may be removed and a new can substituted in its place and coupled to the operating device on the counter as hereinbefore described.

The empty can is returned to the creamery where all relatively movable parts thereof may be readily dismantled and the bulb valve withdrawn and thoroughly cleaned. The parts are then thoroughly sterilized and the can refilled for reshipment.

The foregoing detailed description sets forth the invention in its preferred practical form, but the invention is to be understood as fully commensurate with the appended claims.

Having thus fully described the invention, what I claim as new and desire to secure by Letters Patent is:

1. In an assembly of the character described a suitable fixed support, a milk delivery can arranged in upright position below said support and having therein a pump for pumping out of the can milk contained therein, said pump having a stem guided for vertical reciprocation, and a delivery tube telescoping into said stem and having at its upper end an outlet spout, in combination with a housing on the support above the can, means on the housing for gripping and locking thereto the upper end of the delivery tube when the same is elevated into engagement therewith, a member mounted to reciprocate in the housing, means for securing said member to the pump stem of the can, a rack on said member, a pinion meshing with said rack, and a handle for oscillating the pinion to raise and lower said member and the pump stem of the can for the purpose of elevating the contents of the can through said stem and delivery tube to discharge the liquid above said support.

2. In an assembly of the character described a suitable fixed support, a milk delivery can arranged in upright position below said support and having therein a pump for pumping out of the can milk contained therein, said pump having a stem guided for vertical reciprocation, and a delivery tube telescoping into said stem and having at its upper end an outlet spout, in combination with a housing mounted on the support above the can, means on the housing for gripping and locking thereto the upper end of the delivery tube when the same is elevated into engagement therewith, a member mounted to reciprocate in the housing, means for securing said member to the pump stem of the can, a rack on said member, a pinion meshing with said rack, and a handle for oscillating the pinion to raise and lower said member and the pump stem of the can for the purpose of elevating the contents of the can through said stem and delivery tube to discharge the liquid above said support, and means for periodically feeding air under pressure downwardly through the delivery tube and pump stem for the purpose of agitating the milk in the can, and a check valve for automatically closing the outlet spout when air under pressure is admitted to the delivery tube.

3. In an assembly of the character described a suitable fixed support, a milk delivery can arranged in upright position below said support and having therein a pump for pumping out of the can milk contained therein, said pump having a stem guided for vertical reciprocation, and a delivery tube telescoping into said stem and having at its upper end an outlet spout, and undercut studs spaced apart and carried by the pump stem, in combination with means mounted on the support for holding the delivery tube in elevated position when the same is lifted to a point above the counter, a vertically movable clutch member heaving jaws adapted to engage with said undercut studs, a yoke for locking said jaws to the undercut studs of the pump stem, and means for vertically reciprocating said clutch member for the purpose of operating the pump stem.

4. A milk delivery can having a cover with a central opening therein, a hollow valve stem extending vertically within the can and guided for vertical reciprocation in the upper portion thereof, a resilient pump bulb secured to the lower end of said valve stem and having a valve port communicating with the interior of the valve stem and said bulb having an opening in its bottom, the margins of which normally seat against the bottom of the can, a check valve seated in the valve stem and normally closing said port, and a delivery tube telescoping into the upper end of the valve stem and having at its upper end a delivery outlet, whereby the delivery tube may be elevated to extend above the top of the can through the central opening therein.

5. A milk delivery can having a cover with a central opening therein, a hollow valve stem extending vertically within the can and guided for vertical reciprocation in the upper portion thereof, a resilient pump bulb secured to the lower end of said valve stem and having a valve port communicating with the interior of the valve stem and said bulb having an opening in its bottom, said opening being centrally of the bulb and the walls of the bulb about the margins of the opening being radially tapered to a relatively fine edge adapted to seat upon and conform to the bottom of the can when the bulb is subjected to pressure applied through the valve stem.

6. A milk delivery can having a cover with a central opening therein, a hollow valve stem extending vertically within the can and guided for vertical reciprocation in the upper portion thereof, a resilient pump bulb secured to the lower end of said valve stem and having a valve port communicating with the interior of the valve stem and said bulb having an opening in its bottom, said opening being centrally of the bulb and the walls of the bulb about the margins of the opening being radially tapered to a relatively fine edge adapted to seat upon and conform to the bottom of the can when the bulb is subjected to pressure applied through the valve stem, and a check valve for permitting the flow of fluid from the bulb into the valve stem and precluding the flow of fluid in a contra-direction.

7. A milk delivery can having a cover with a central opening therein, a hollow valve stem extending vertically within the can and guided for vertical reciprocation in the upper portion thereof, a resilient pump bulb secured to the lower end of said valve stem and having a valve port communicating with the interior of the valve stem and said bulb having an opening in its bottom, said opening being centrally of the bulb and the walls of the bulb about the margins of the opening being radially tapered to a relatively thin edge adapted to seat upon and conform to the bottom of the can when the bulb is subjected to pressure applied through the valve stem, and a check valve for permitting the flow of fluid from the bulb into the valve stem and precluding the flow of fluid in a contra-direction, the valve stem being provided with vent openings near its lower end and the pump bulb having a resilient wall portion overlying said vent openings and acting as a check valve therefor.

8. A milk delivery can provided in its upper portion with a cylindrical guide, a piston mounted for reciprocation in said guide, a tubular valve stem secured to the piston and projecting downwardly toward the bottom of the can, and a resilient pump bulb secured to the lower end of the valve stem and having an inlet opening from the interior of the can, and an outlet opening into the interior of the valve stem, whereby downward movement of the piston will compress the pump bulb against the bottom of the can to force liquid from the bulb upwardly through the valve stem, the pump bulb having sufficient inherent resiliency to expand when the piston is subsequently elevated to recharge the bulb with liquid from the can, and a stop on the valve stem between the piston and the pump bulb for limiting the upward movement of the valve stem to preclude inadvertent lifting of the piston free from the tubular guide.

9. The combination of a milk delivery can having therein an upright milk delivery tube provided at its upper end with a laterally projecting outlet spout, a cover for the can, an upright cylindrical guide normally open at both ends and supported by the cover of the can, said guide being of sufficient radius to receive within its confines said laterally projecting outlet spout, a piston slidable within said guide below the spout and closely fitted about the delivery tube and within the cylindrical guide to preclude the entrance of foreign matter into the can through said guide.

10. The combination of a milk delivery can having therein an upright milk delivery tube provided at its upper end with a laterally projecting outlet spout, a cover for the can, an upright cylindrical guide normally open at both ends and supported by the cover of the can, said guide being of sufficient radius to receive within its confines said laterally projecting outlet spout, a piston slidable within said guide below the spout and closely fitted about the delivery tube and within the cylindrical guide to preclude the entrance of foreign matter into the can through said guide, and a disruptable seal for closing the upper end of the cylindrical guide above said outlet spout while the can is in transit.

11. The combination of a milk delivery can having therein an upright milk delivery tube provided at its upper end with a laterally projecting outlet spout, a cover for the can, an upright cylindrical guide normally open at both ends and supported by the cover of the can, said guide being of sufficient radius to receive within its confines said laterally projecting outlet spout, a piston slidable within said guide below the spout and closely fitted about the delivery tube and within the cylindrical guide to preclude the entrance of foreign matter into the can through said guide, and a tubular pump operating stem embracing the dispensing tube below the piston and secured to the latter for axial reciprocation therewith.

12. An assembly for the retail dispensing of milk comprising a shelf provided therein with an opening, a milk delivery can arranged in upright position under the shelf and below said opening, a pump within said can having a tubular pump stem normally extending upwardly from near the bottom to near the top of the can, a delivery tube slidably telescoped into said tubular pump stem and having an outlet spout near its upper end, said delivery tube and the pump and its stem being mounted in cooperative relation within the confines of said delivery can when the latter is shipped from and returned to the creamery, in combination with means permanently supported on the shelf above the can to secure the dispensing tube in elevated dispensing position when the latter is raised to coact therewith, a pump stem operating member also permanently supported on the shelf, means to detachably couple said operating member to the pump stem, and means also permanently supported on the shelf for actuating said operating member.

13. An assembly for the retail dispensing of milk comprising a shelf provided therein with an opening, a milk delivery can arranged in upright position under the shelf and below said opening, a pump within said can having a tubular pump stem normally extending upwardly from near the bottom to near the top of the can, a delivery tube slidably telescoped into said tubular pump stem and having an outlet spout near its upper end, said delivery tube and the pump and its stem being mounted in cooperative relation within the confines of said delivery can when the latter is shipped from and returned to the creamery, in combination with means permanently supported on the shelf above the can to secure the dispensing tube in elevated dispensing position when the latter is raised to coact therewith, a pump stem operating member also permanently supported on the shelf, means to detachably couple said operating member to the pump stem, means also permanently supported on the shelf for actuating said operating member, means also permanently supported on the shelf for actuating said operating member, and means, also permanently supported on the shelf for periodically feeding air under pressure downwardly through the delivery tube and pump stem for the purpose of agitating the milk in the can, and a check valve for automatically closing the outlet spout when air under pressure is admitted to the delivery tube.

14. A collapsible pump bulb having at its top a central liquid outlet opening and provided with a central liquid inlet opening at its bottom to which the wall of the bulb is radially tapered in thickness to a relatively fine edge, and supporting bosses formed exteriorly on the bottom of the bulb in radially spaced relation to said edge.

15. A collapsible resilient pump bulb having a centrally located liquid inlet at its bottom and a centrally located liquid outlet at its top, and an external, longitudinally slitted, tubular flange integral with the bulb and surrounding the outlet opening at the top thereof.

16. A collapsible resilient pump bulb having at its top a centrally located liquid outlet opening surrounded by an external, longitudinally slitted tubular flange and provided at its bottom with a centrally located liquid inlet opening to which the wall of the bulb is tapered in thickness to a relatively fine edge.

WILLIAM TAMMINGA.